United States Patent [19]

Brau et al.

[11] Patent Number: 4,479,218
[45] Date of Patent: Oct. 23, 1984

[54] FREE ELECTRON LASER USING RF COUPLED ACCELERATING AND DECELERATING STRUCTURES

[75] Inventors: Charles A. Brau; Donald A. Swenson; Thomas J. Boyd, Jr., all of Los Alamos, N. Mex.

[73] Assignee: The United States of America as represented by the United States Department of Energy, Washington, D.C.

[21] Appl. No.: 275,478

[22] Filed: Jun. 19, 1981

Related U.S. Application Data

[63] Continuation-in-part of Ser. No. 90,846, Nov. 2, 1979.

[51] Int. Cl.³ .............................................. H01S 3/00
[52] U.S. Cl. .......................................... 372/2; 372/81
[58] Field of Search ...................................... 372/2, 81

[56] References Cited

U.S. PATENT DOCUMENTS 3,822,410 7/1974 Madey .................................... 372/2
4,189,686 2/1980 Brau et al. ............................. 372/2
4,287,488 9/1981 Brau et al. ............................. 372/2

FOREIGN PATENT DOCUMENTS 2005909 4/1979 United Kingdom .................... 372/2

OTHER PUBLICATIONS

Elias, Phys. Rev. Lett. 42, 977–981, Apr. 9, 1979.
Deacon et al., Phys. Rev. Lett. 38, 892–894, (1977).
McDermott et al., Phys. Rev. Lett. 41, 1368–1371, (1978).
Klystrons and Microwave Triodes, Hamilton et al., (McGraw-Hill, N.Y., 1948).
Hoyt et al., Rev. Sci. Instruments, 37, 755–762, (1966).
Nagle et al., Rev. Sci. Instruments 38, 1583–1587, (1967).
Knapp et al., Rev. Sci. Instruments 39, 979–991, (1968).
Manca et al., IEEE Trans. Nuclear Sci. NS 24, 1087–1090, (1977).
Segall, "Free Electron Lasers for Laser Fusion" Topical Meeting Inert Confinement Feb., 1978.
Potter et al., IEEE Trans. Nucl. Sci. NS 26, 3763, (1979).
Schriber et al., Proc. 1972 Proton Linear Accel. Conf., Oct. 10–13, 1972.
Neal, "Stanford Two-Mile Linear Accelerator", (Benjamin, Inc, New York, 1968), pp. 241–271.
Pering et al., IEEE Trans. Nuc. Sci. NS 16, 1–5, (1969).
Mavrogenes et al., IEEE Trans. Nuc. Sci. NS 20, 919–922, (1973).

Primary Examiner—William L. Sikes
Assistant Examiner—Léon Scott, Jr.
Attorney, Agent, or Firm—Samuel M. Freund; Paul D. Gaetjens; Michael F. Esposito

[57] ABSTRACT

A free electron laser and free electron laser amplifier using beam transport devices for guiding an electron beam to a wiggler of a free electron laser and returning the electron beam to decelerating cavities disposed adjacent to the accelerating cavities of the free electron laser. Rf energy is generated from the energy depleted electron beam after it emerges from the wiggler by means of the decelerating cavities which are closely coupled to the accelerating cavities, or by means of a second bore within a single set of cavities. Rf energy generated from the decelerated electron beam is used to supplement energy provided by an external source, such as a klystron, to thereby enhance overall efficiency of the system.

19 Claims, 6 Drawing Figures

FREE ELECTRON LASER USING RF COUPLED ACCELERATING AND DECELERATING STRUCTURES

This invention is the result of a contract with the Department of Energy (Contract No. W-7405-ENG-36).

This invention is a continuation-in-part of application Ser. No. 90,846, filed Nov. 2, 1979 by Charles A. Brau, Donald A. Swenson, and Thomas J. Boyd, Jr. entitled "RF Feedback Free Electron Laser" which is hereby incorporated by reference for all that it teaches.

BACKGROUND OF THE INVENTION

The present invention pertains generally to lasers and more particularly to free electron lasers.

Since the concept of the first laser was demonstrated, the scientific community has had a great interest in the development of a high power laser which could be continuously tuned over a wide range of frequencies. A high power laser which could be tuned in this manner would have great utility for industrial chemistry applications to supply energy to specific reactions. For example, such a laser could be used as a source to clean exhaust gases from combustion by selectively decomposing noxious substances. Similarly, feedstocks could be purified for chemical processes by selective destruction of contaminants. For example, coal gasification can be accomplished by using a high power continuously tunable laser to remove impurities which would adversely affect catalysts used in the gasification process.

With the advent of the gaseous molecular laser, high powers have been achieved. However, gaseous molecular lasers are incapable of being tuned over more than a very restricted range of frequencies and produce only a specific set of frequencies depending upon the gaseous lasing medium.

The concept of extracting coherent optical radiation from a stream of relativistic electrons, i.e., the free electron laser, was first described by J. M. J. Madey, of Stanford, in 1971. Several years ago, J. M. J. Madey et al. reported lasing action from stimulated Bremsstrahlung from the Stanford Superconducting Accelerator as reported in Phys. Rev. Letts. 38, 892 (1977). A collaborative effort by the Columbia University Laboratory and the Naval Research Laboratory has produced a laser based on stimulated Raman scattering by free electrons as reported by D. B. McDermott et al., Phys. Rev. Letts. 41, 1368 (1978). The report of these results of the "free electron laser" has caused much excitement in the scientific community since it is possible that free electron lasers will be able to produce exceedingly high powers at low cost and continuously tunable frequency.

In addition to the continuously tunable frequency and potentially high output powers obtainable from the free electron laser, the free electron laser has the added advantage of the absence of a lasing medium, such as a fluid, glass, or gaseous molecules, which tend to limit the power and spatial resolution by nonlinear optical effects in the lasing medium.

However, to date, only low efficiencies have been demonstrated or envisioned by the various free electron laser systems proposed having wavelengths shorter than the near ir. Consequently, tremendous energy is required to operate free electron lasers at short wavelengths (e.g., less than approximately 1 micron) and high output powers, necessarily affecting utilization of these devices in industrial applications and other areas.

The dc accelerator/decelerator concept described by L. R. Elias, Phys. Rev. Letts. 42, 977 (1979) does achieve good efficiencies at longer wavelengths (e.g., less than approximately 10 microns). However, many industrial applications as well as other applications require shorter wavelengths for operation.

U.S. patent application Ser. No. 90,846 filed Nov. 2, 1979 by Charles A. Brau, Donald A. Swenson, and Thomas J. Boyd, Jr. entitled "RF Feedback Free Electron Laser," now U.S. Pat. No. 4,287,488 issued Sept. 1, 1981, discloses a configuration using rf coupled accelerating and decelerating structures having dual electron beams which is capable of producing high efficiencies at shorter wavelengths. However, the use of dual electron beams and the multiple structure cavity required in the above disclosed application results in a device which is somewhat complex to implement.

SUMMARY OF THE INVENTION

It is therefore an object of the present invention to provide an improved free electron laser.

It is also an object of the present invention to provide a free electron laser which is simple and easy to implement.

Another object of the present invention is to provide a free electron laser which is simple and easy to implement and produces high efficiencies at wavelengths shorter than the near ir.

Another object of the present invention is to provide an electron beam energy recovery system for a free electron laser.

Another object of the present invention is to provide a free electron laser amplifier system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise an electron beam energy recovery system for a free electron laser comprising: first cavity means for accelerating an electron beam deriving energy therefor from a rf energy source coupled thereto; second cavity means disposed adjacent said first cavity means, said second cavity means for decelerating the energy depleted electron beam to extract energy from said electron beam to supplement rf energy supplied by said rf energy source to said first cavity means to accelerate said electron beam; electron beam transport means for directing the energy depleted electron beam to said second cavity means; whereby placement of said first cavity means adjacent said second cavity means reduces rf coupling losses which enhances efficiency of said electron beam energy system.

The present invention may also comprise, in accordance with its objects and purposes, an electron beam energy recovery system for a free electron laser comprising: means for producing an electron beam; a first bore means in an electron beam cavity structure for accelerating said electron beam in response to rf energy generated in said electron beam cavity structure; a rf energy source coupled to said electron beam cavity structure; second bore means in said electron beam cavity structure for decelerating the energy depleted electron beam to extract energy from said electron beam to supplement rf energy supplied by said rf energy source to said electron beam cavity structure; electron beam transport means for directing the energy depleted electron beam to said second bore means; whereby energy efficiency of said electron beam energy system is enhanced by accelerating and decelerating said electron beam in said electron beam cavity structure.

The present invention may also comprise, in accordance with its objects and purposes, a free electron laser system comprising: means for producing an electron beam; first cavity means for accelerating said electron beam in response to rf energy; a rf energy source coupled to said first cavity means; second cavity means disposed adjacent said first cavity means, said second cavity means for decelerating said electron beam to extract energy from said electron beam to supplement rf energy supplied by said rf energy source to said first cavity means to thereby enhance efficiency of said electron beam laser system; wiggler means for generating coherent radiation by interacting with the electron beam; an optical resonant cavity surrounding said wiggler means; electron beam transport means for directing said electron beam from said first cavity means, through said wiggler means, to said second cavity means; whereby placement of said first cavity means adjacent said second cavity means reduces rf coupling losses to further enhance the efficiency of said electron beam laser system.

The present invention may also comprise, in accordance with its objects and purposes, a free electron laser system comprising: means for producing an electron beam; first bore means in an electron beam cavity structure for accelerating said electron beam in response to rf energy generated in said electron beam cavity structure; an rf energy source coupled to said electron beam cavity structure; second bore means in said electron beam cavity structure for decelerating said electron beam to extract energy to supplement the rf energy supplied by said rf energy source to said electron beam cavity structure; wiggler means for generating coherent radiation by interacting with the electron beam; an optical resonant cavity surrounding said wiggler means; electron beam transport means for directing said electron beam from said first bore means, through said wiggler means, to said second bore means; whereby the energy efficiency of said electron beam energy system is enhanced by accelerating and decelerating said electron beam in said electron beam cavity structure.

The present invention may also comprise, in accordance with its objects and purposes, a free electron laser amplifier system comprising: means for producing an electron beam; first cavity means for accelerating said electron beam; a rf energy source coupled to said first cavity means; second cavity means disposed adjacent said first cavity means, said second cavity means for decelerating said electron beam to extract energy from said electron beam to supplement rf energy supplied by said rf energy source to said first cavity means to thereby enhance efficiency of said electron beam laser system; wiggler means for extracting energy from said electron beam to amplify an external source of coherent radiation; electron beam transport means for directing said electron beam from said first cavity means, through said wiggler means, to said second cavity means; whereby placement of said first cavity means adjacent said second cavity means reduces rf coupling losses to further enhance the efficiency of said electron beam laser system.

The present invention therefore overcomes the disadvantages and limitations of the prior art by providing an improved free electron laser system and an improved electron beam energy system for a free electron laser. The advantages of the present invention are that it provides an efficient free electron laser system in a simple and easily implemented device. The present invention overcomes the complexities of prior art energy recovery systems and is capable of providing high power tunable laser frequencies in the infrared, visible and ultraviolet spectral regions.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT OF THE INVENTION

The present invention comprises an improvement over U.S. Pat. Nos. 4,189,686 and 4,193,043 which are hereby incorporated by reference for all thay they teach.

The present invention uses radio frequency (rf) linear accelerator technology wherein a rf signal produces an electromagnetic field in various cavity configurations to accelerate the electrons to relativistic velocities. This technology is well understood and relatively inexpensive to implement in comparison to induction accelerators, diode accelerators, etc., for purposes of the present invention. Rf accelerators can be scaled to extremely high average powers utilizing present technology. Additionally, rf accelerators have high reliability and can be operated for extended periods without shutdown. Furthermore, rf accelerators do not depend upon unreliable high power pulse switching circuitry for operation, which limits utility of other laser systems. The present invention can operate in cw mode to reduce the occurrence of mirror damage and atmospheric breakdown. Moreover, enhancement of the peak laser flux above the cw value is achieved inherently in the rf accelerator of the present invention by taking advantage of the micropulse structure of the e-beam. In this way, the laser flux is compressed into very short, intense bunches, i.e., 10–100 picoseconds, which enhances laser operation due to the pulse nature while precluding mirror damage and atmospheric breakdown due to the short period of the pulses.

Figure 1:
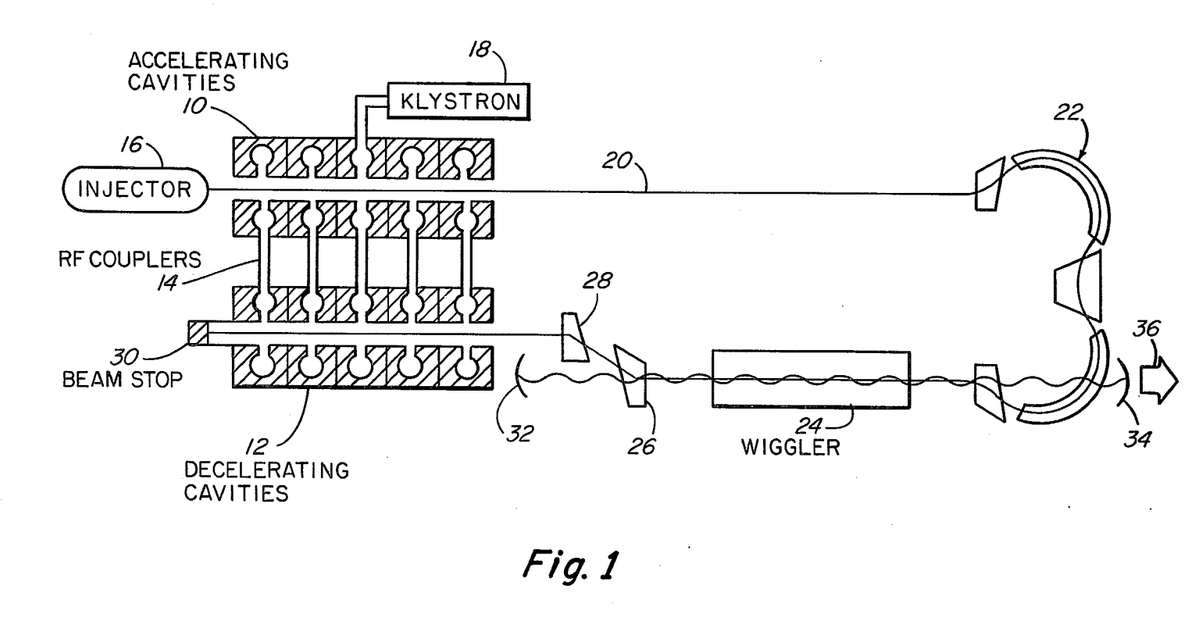
FIG. 1 is a schematic illustration illustrating one manner of implementing the preferred embodiment of the invention using separate accelerating and decelerating cavity structures.

FIG. 1 discloses one manner of implementing the preferred embodiment of the invention. As shown in FIG. 1, accelerating cavities 10 and decelerating cavities 12 are placed adjacent one another with rf coupling cavities 14 connecting the two sets of cavities 10 and 12. This configuration substantially reduces the length of the microwave feedback loop and thereby substantially reduces the amount of power dissipated in rf coupling cavities 14.

In operation, injector 16 produces an electron beam which is accelerated in accelerating cavities 10 from power supplied by klystron 18 and from rf coupling cavities 14. The electron beam 20 is directed to beam transport 22 which changes the beam direction by approximately 180°. Beam transport 22 need not be isochronous in all cases. In certain circumstances, it is desirable not to have an isochronous electron beam 22 for injection into a wiggler. For example, a non-isochronous beam transport system could be used to stretch out the electron pulses from the accelerator in order to get longer laser pulses having a narrower spectral bandwidth. The beam transport system could therefore be designed to produce the desired results. After electron beam 20 exits beam transport 22, electron beam 20 is directed into wiggler 24 where coherent radiation is generated from the electron beam energy. The electron beam is then directed through bending magnets 26 and 28 to decelerating cavities 12 where rf energy is generated from the remaining electron beam 20 energy and channeled through rf coupling cavities 14 to supplement rf energy provided by klystron 18 and thereby enhance the overall efficiency of the system. The bending magnets 26 and 28 may or may not form an isochronous system. For example, in a non-isochronous system, the faster and slower electrons emerging from wiggler 24 may be transported to the decelerating cavities 12 at different times (depending upon the energy level of these electrons) to be in the appropriate phase with the rf fields in the decelerating cavities to extract the maximum available energy from the decelerating electrons. All of the electrons emerging from decelerating cavities 12 are stopped by beam stop 26. An optical resonant cavity is formed by total reflector 32 and partial reflector 34. A coherent output laser beam 36 is produced at the output of partial reflector 34.

The accelerating structure 10 and decelerating structure 12 can be identical in design and can comprise any desired cavity design such as the cavities disclosed in "Computer Designed 805 MHz Proton Linac Cavities" by Harry C. Hoyt et al. reported in Rev. Sci. Instr., vol. 37, n. 6, pp. 755–762, June 1966; "Coupled Resonator Model for Standing Wave Accelerator Tanks" by D. E. Nagle et al., Rev. Sci. Instr., vol. 38, n. 11, pp. 1538–1587, November 1967; and "Standing Wave High Energy Linear Accelerator Structures" by E. A. Knapp et al., Rev. Sci. Instr., vol. 38, n. 7, pp. 979–991, July 1968, or the disk or washer structure disclosed in "High Energy Accelerator Structures for High Gradient Proton Linac Applications" by J. J. Manca, IEEE Transactions on Nuclear Science, vol. NS-24, n. 3, June 1977, and "Experimental and Calculated RF Properties of The Disk and Washer Structure" by J. M. Potter et al., IEEE Transactions on Nuclear Science, vol. NS-26, n. 3, June 1979. Of course, the structures 10 and 12 need not be identified in design, so long as they have the same frequency for the accelerating mode. In fact, it might be advantageous to use different structures having different cavities to reduce coupling of undesired modes. In general, any suitable rf accelerator for accelerating multiampere (peak current) electron beams can be used in accordance with the present invention, such as the cavity structure disclosed in the article "Beam Test With S-Band Standing Wave Accelerators Using On-Axis Couplers" by S. O. Schriber et al., appearing in Proceedings of 1972 Proton Linear Accelerator Conference, Oct. 10–13, 1972.

Injector 16 of FIG. 1 comprises any suitable injector which produces multiampere currents such as that utilized in the Stanford Linear Accelerator (SLAC) as disclosed in the text "The Stanford Two-Mile Accelerator" by R. B. Neal, W. A. Benjamin, Inc., New York, 1968, in Chapter 8, Injector pp. 241–271. Similarly, the injectors disclosed in the articles entitled "Performance of 140 MeV High Current Show Pulse Linac at ORNL" by N. C. Pering et al., appearing in IEEE Transactions on Nuclear Science, vol. NS-16, n. 3, June 1969, and "Subnanosecond High Intensity Beam Pulse" by G. Mavrogenes et al., appearing in IEEE Transactions on Nuclear Science, vol. NS-20, n. 3, June 1973, disclose other suitable injectors for use in accordance with the present invention.

Wiggler 24, illustrated in FIG. 1, generates a rippled magnetic field which can be produced by a helical coil such as disclosed by D. A. G. Deacon et al., Phys. Rev. Letts., 38, 892 (1977), or by a set of rings that carry current in alternate directions such as disclosed by D. B. McDermott et al., Phys. Rev. Letts. 41, 1368 (1978), or by suitable arrangements of permanent magnets.

The period of the wiggler and the energy of the electrons determine the frequency produced by the free electron laser. The nominal relationship between the wiggler wave number ($k_w$) and the optical (signal) wave number ($k_s$) is:

$$k_w = k_s(1+e^2B^2/m^2c^2)/2\gamma^2,$$

which is called the resonance condition. An electron beam moving through a wiggler satisfying the resonance condition will not emit any radiation, but will bunch at the optical wavelength. If the wiggler wave number is slightly lower than the resonance condition, the electron beam will both bunch and radiate, thereby increasing the energy of the radiation field. For a single pass free electron laser, such as disclosed in FIG. 1, the most efficient approach utilized is one in which the wiggler wave number and the field are varied in such a way as to "trap" a significant number of electrons in a potential well and decelerate the electrons coherently. This is achieved by using a wiggler which has a decreasing spatial period or decreasing magnetic field wherein the length and strength of each successive magnetic period is tuned to the energy of the electron exiting the preceeding magnetic field. Such a "tapered wiggler" is capable of extracting several percent of the energy of the beam. Very importantly, the distribution function emerging from the wiggler is compatible with the decelerator 32 which is used to recover beam energy as set forth below. Other types of wigglers such as a uniform wiggler, or an "optical klystron" may also be used in accordance with the present invention."

As described briefly above, the decelerating cavities 12 function to decelerate the electrons emerging from the wiggler to a low energy and thereby convert the kinetic energy of the electrons to rf energy. The wiggler 24 extracts energy from the electron beam 20 and produces an electron momentum distribution having both slow electrons and electrons slightly faster than the original velocity. The decelerating cavities 12 are tuned to decelerate both fast and slow electrons to extract a major portion of energy from the electron beam emerging from wiggler 24. In this manner, the electron momentum distribution of the electron beam emerging from wiggler 24 is compatible with the decelerator concept. If desired, the fastest electrons can be further decelerated in a second linac structure (not shown) to recover additional energy. The rf energy generated by decelerating cavities 12 is then channeled into accelerator cavities 10, thereby recovering a substantial portion of energy of the electron beam not extracted by wiggler 24. The recovered power supplements the rf power from the klystron. If rf coupling cavities 14 are not desired, a Magic T can be used as disclosed in "Microwave Duplexes" by Smullin and Montgomery, McGraw Hill Inc., New York, 1948, Sec. 8.8, pp. 350-352.

Figure 2:
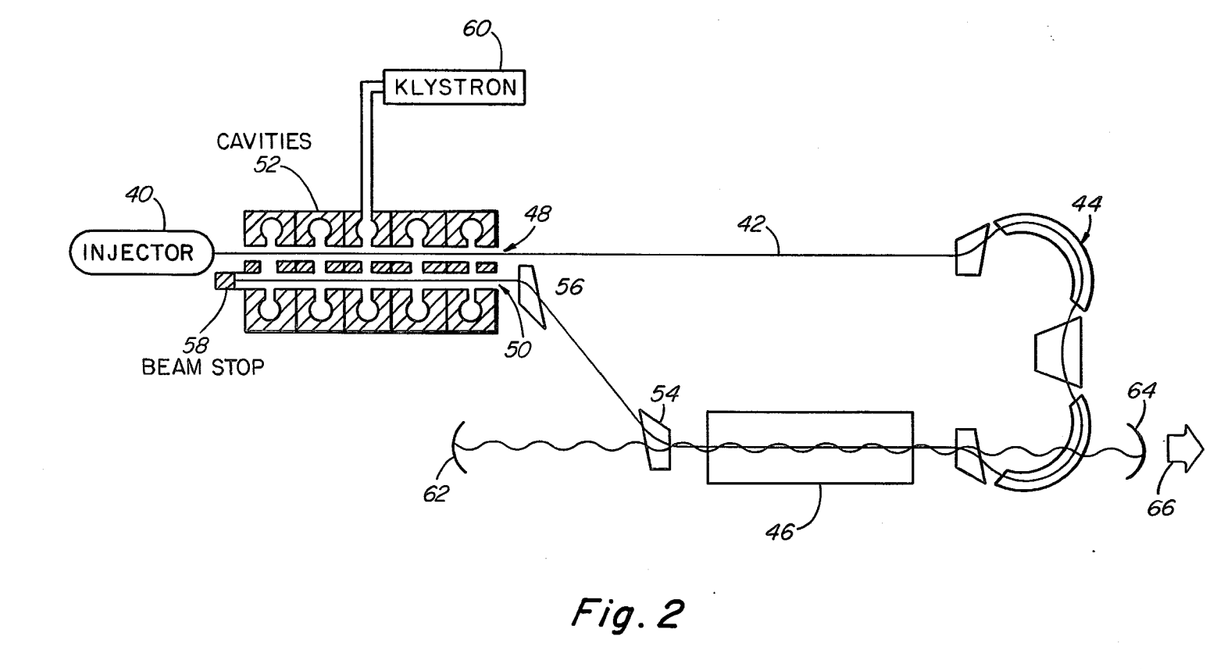
FIG. 2 is a schematic illustration of another manner of implementing the preferred embodiment of the invention using one cavity structure with separate bores for acceleration and deceleration of the electron beam.

FIG. 2 schematically illustrates another manner of implementing the preferred embodiment of the present invention. Implementation, as illustrated in FIG. 2, is accomplished in a manner similar to that illustrated in FIG. 1. As shown in FIG. 2, an injector 40 produces an electron beam 42 which is applied to opening 48 of cavities 52. The electron beam 42 is again redirected by beam transport 44 through wiggler 46 and bending magnets 54 and 56 into opening 50 of cavities 52, to beam stop 58.

In operation, klystron 60 provides energy to cavities 52 which accelerate the electron beam 42 in opening 48. When the electron beam 42 is applied to opening 50, energy is extracted and applied directly to the cavities 52 to supplement energy of klystron 60. Total reflector 62 and partial reflector 64 form an optical resonant cavity to produce the coherent output laser beam 66.

Figure 3:
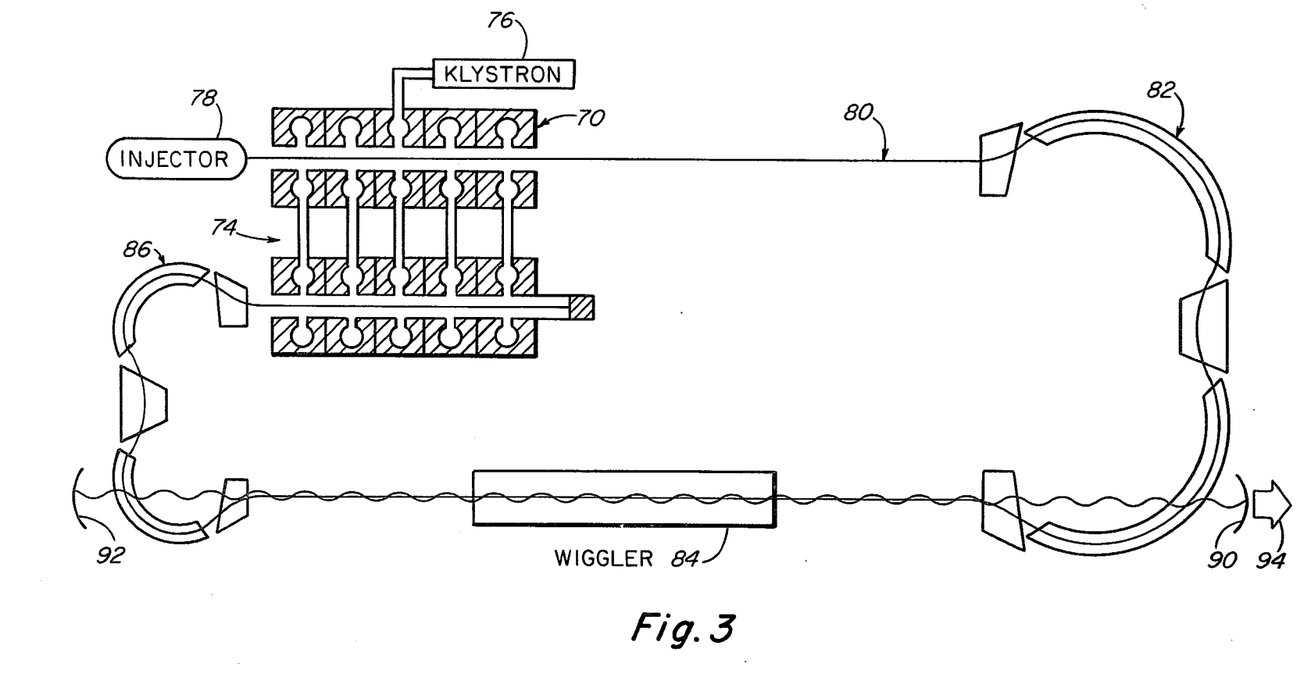
FIG. 3 is a schematic illustration of still another manner of implementing the preferred embodiment of the invention.

FIG. 3 schematically illustrates an additional manner of implementing the preferred embodiment of the present invention. As illustrated in FIG. 3, accelerator cavities 70 accelerate the electron beam 80 produced by injector 78. Energy to accelerate the electron beam 80 is obtained from klystron 76 and rf couplers 74. The electron beam 80 is directed to wiggler 84 by beam transport 82. Wiggler 84 produces a spatially periodic magnetic field which interacts with the electron beam 80 and the laser field to produce coherent photons, as described above. The optical resonant cavity formed by reflectors 90 and 92 produce the output laser beam 94. Beam transport 86 directs the electron beam emerging from wiggler 84 through decelerating cavities 72 which extract a major portion of the energy from the electron beam and transform the energy into rf energy. The rf energy extracted in decelerating cavities 72 is coupled to accelerating cavities 70 via couplers 74 to supplement the energy from klystron 76 required to accelerate electron beam 80. Low energy electrons emerging from decelerating cavities 72 are stopped by beam stop 88. Of course, rf couplers 14 illustrated in FIG. 1, and rf couplers 74, illustrated in FIG. 3, can comprise rf resonant coupling cavities to maximize energy efficiency and minimize coupling of undesired frequencies.

Figure 4:
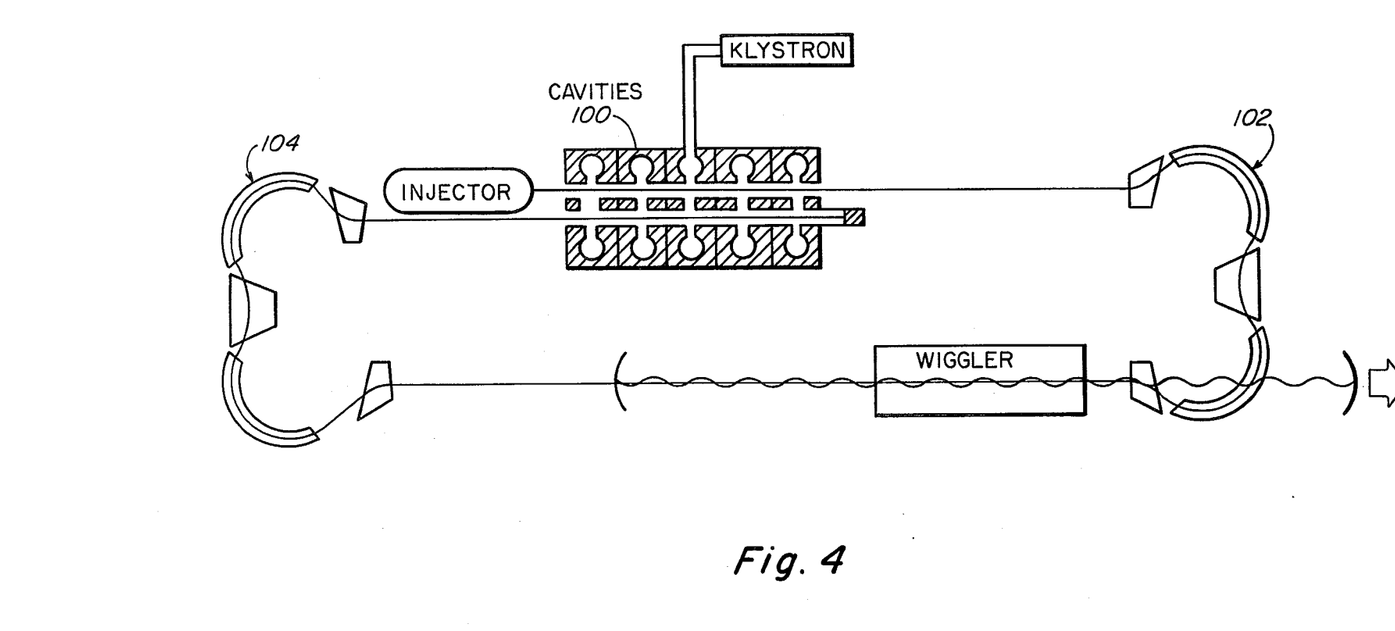
FIG. 4 is a schematic illustration of still another manner of implementing the preferred embodiment of the invention.

FIG. 4 schematically illustrates an additional manner of implementing the preferred embodiment of the present invention. The device of FIG. 4 utilizes cavities 100 similar to cavities 52 illustrated in FIG. 2 and two sets of beam transports 102 and 104 for changing the directon of the electron beam by approximately 360° before insertion in cavities 100, such as is illustrated in FIG. 3. The optical resonant cavity and wiggler are similar to the optical resonant cavities and wigglers illustrated in FIGS. 1-3.

Figure 5:
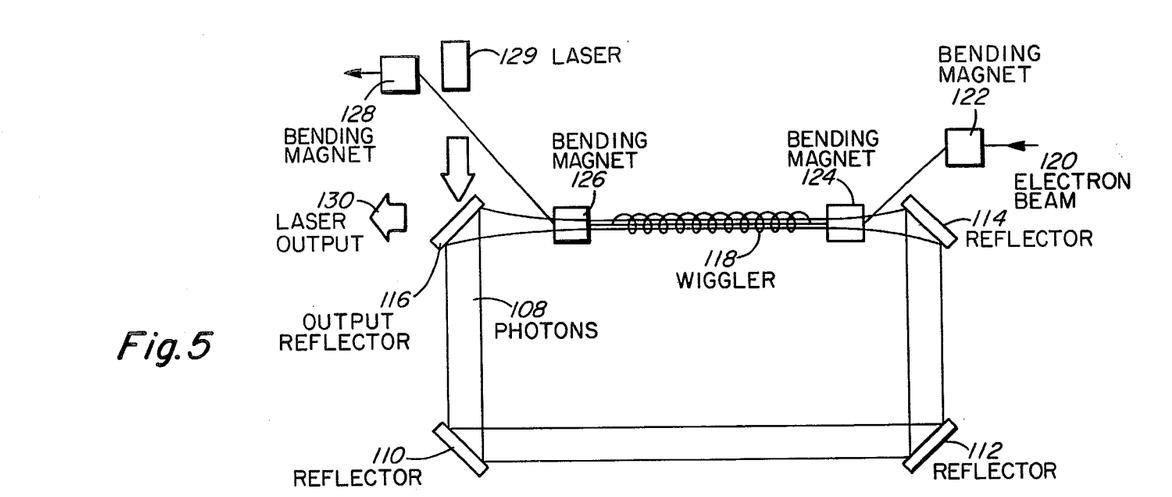
FIG. 5 is a schematic illustration of a ring resonator which can be used in any of the devices illustrated in FIGS. 1-4.

FIG. 5 illustrates a ring resonator for use with the various devices of the preferred embodiment of the invention illustrated in FIGS. 1-4. Since amplification of coherent light is accomplished only when photons of the resonator are traveling in the same direction as the electron beam, it is often advantageous to use a ring resonator, such as illustrated in FIG. 5, which directs photons 108 in a closed loop circular pattern using reflectors 110, 112, 114, 116 so that the photons pass through wiggler 118 only in the direction of the electron beam 120. Electron beam 120 is directed through the wiggler via bending magnets 122 and 124 and then directed away from the ring resonator via bending magnets 126 and 128. Output reflector 116 produces laser output 130 which is directed along the optical axis of wiggler 118. Of course, output reflector 116 can be disposed anywhere within the ring resonator, illustrated in FIG. 5 to point the output beam in various directions. Another advantage of the ring resonator is that an external laser 129 may be used, as shown in FIG. 5, to inject a signal into the resonator for purposes of starting the laser oscillation more quickly or at a preferred wavelength. Used in this way, the external laser is not exposed to, and does not interfere with, the laser output beam 130.

Figure 6:
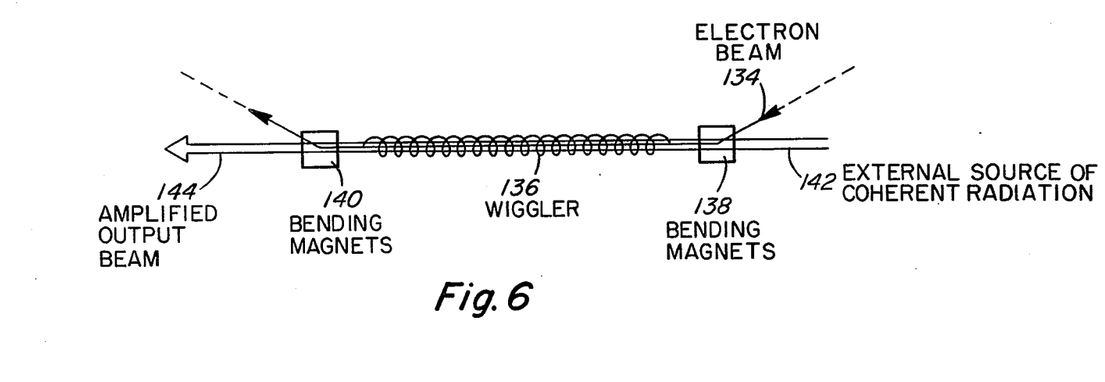
FIG. 6 is a schematic illustration of the manner of implementing, the devices illustrated in FIGS. 1-5 as a laser amplifier system.

FIG. 6 illustrates the manner in which the devices of FIGS. 1-5 can be utilized as a free electron laser amplifier. In operation, an electron beam 134 is directed through wiggler 136 via bending magnets 138 and 140. An external source of coherent radiation 142, such as that provided by an external laser, provides an optical signal at a specified frequency at which the free electron laser amplifier is tuned. Upon passing through wiggler 136, the external source of coherent radiation 142 is amplified to produce an amplified output beam 144. Of course, any desired injection laser can be utilized as an external source of coherent radiation 142, including other free electron laser oscillators and amplifiers. The tunable nature of the free electron laser provides a wide range of uses for the free electron laser amplifier in conjunction with other lasers including high power gaseous molecular lasers.

The present invention therefore provides a high efficiency free electron laser which relies upon well-developed and reliable rf accelerator technology. High efficiencies are obtained by extracting energy from the energy depleted electron beam after it passes through the wiggler, converting this energy into rf energy and then using the rf energy to supplement rf energy provided by a klystron, or magnetron, or other rf source, to accelerate the electron beam to be injected into the wiggler. The device of the present invention can be implemented in a simple and easy manner to avoid the complex devices of the prior art.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electron beam energy recovery system for a free electron laser comprising:
   first cavity means for accelerating an electron beam;
   a rf energy source;
   second cavity means disposed adjacent said first cavity means, said second cavity means for decelerating said electron beam to extract rf energy from said electron beam to supplement rf energy supplied by said rf energy source to said first cavity means to accelerate said electron beam;
   electron beam transport means for directing said electron beam from said first cavity means to said second cavity means;
   whereby placement of said first cavity means adjacent said second cavity means reduces rf coupling losses to thereby enhance efficiency of said electron beam energy system.

2. The system of claim 1 wherein said electron beam transport means comprises means for changing the direction of said electron beam by approximately 180°.

3. The system of claim 1 wherein said electron beam transport means comprises means for changing the direction of said electron beam by approximately 360°.

4. The system of claim 1 wherein said electron beam transport means comprises means for changing the direction of said electron by an angle less than 360°.

5. An electron beam energy system for a free electron laser comprising:
   means for producing an electron beam;
   a first bore means in an electron beam cavity structure for accelerating said electron beam in response to rf energy generated in said electron beam cavity structure;
   a rf energy source coupled to said electron beam cavity structure; second bore means in said electron beam cavity structure for decelerating said electron beam to extract rf energy from said electron beam to supplement rf energy supplied by said rf energy source to said electron beam cavity structure;
   electron beam transport means for directing said electron beam from said first bore means to said second bore means;
   whereby energy efficiency of said electron beam energy system is enhanced by accelerating and decelerating said electron beam in said electron beam cavity structure.

6. The system of claim 5 wherein said electron beam transport means comprises means for changing the direction of said electron beam by approximately 180°.

7. The system of claim 5 wherein said electron beam transport means comprises means for changing the direction of said electron beam by approximately 360°.

8. A free electron laser system comprising:
   means for producing an electron beam;
   first cavity means for accelerating said electron beam in response to rf energy;
   a rf energy source coupled to said first cavity means;
   second cavity means disposed adjacent said first cavity means, said second cavity means for decelerating said electron beam to extract rf energy from said electron beam to supplement rf energy supplied by said rf energy source to said first cavity means to thereby enhance efficiency of said electron beam laser system;
   wiggler means for extracting coherent radiation from said electron beam;
   an optical resonant cavity surrounding said wiggler means;
   electron beam transport means for directing said electron beam from said first cavity means, through said wiggler means, to said second cavity means;
   whereby placement of said first cavity means adjacent said second cavity means reduces rf coupling losses to further enhance efficiency of said electron beam laser system.

9. The system of claim 8 wherein said electron beam transport means comprises means for changing the direction of said electron beam by approximately 180°.

10. The system of claim 8 wherein said electron beam transport means comprises means for changing the direction of said electron beam by approximately 360°.

11. The laser system of claim 8 wherein said optical resonant cavity comprises a ring cavity.

12. A free electron laser system comprising:
   means for producing an electron beam;
   first bore means in an electron beam cavity structure for accelerating said electron beam in response to rf energy generated in said electron beam cavity structure;
   an rf energy source coupled to said electron beam cavity structure;
   second bore means in said electron beam cavity structure for decelerating said electron beam to extract rf energy to supplement rf energy supplied by said rf energy source to said electron beam cavity structure;
   wiggler means for extracting coherent radiation from said electron beam;
   an optical resonant cavity surrounding said wiggler means;
   electron beam transport means for directing said electron beam from said first bore means, through said wiggler means, to said second bore means;
   whereby energy efficiency of said electron beam energy system is enhanced by accelerating and decelerating said electron beam in said electron beam cavity structure.

13. The system of claim 12 wherein said electron beam transport means comprises means for changing the direction of said electron beam by approximately 180°.

14. The system of claim 12 wherein said electron beam transport means comprises means for changing the direction of said electron beam by approximately 360°.

15. The laser system of claim 12 wherein said optical resonant cavity comprises a ring cavity.

16. A free electron laser amplifier system comprising:
   means for producing an electron beam;
   first cavity means for accelerating said electron beam;
   a rf energy source coupled to said first cavity means;

second cavity means disposed adjacent said first cavity means;

said second cavity means for decelerating said electron beam to extract rf energy from said electron beam to supplement rf energy supplied by said rf energy source to said first cavity means to thereby enhance efficiency of said electron beam laser system;

wiggler means for extracting coherent radiation from said electron beam to amplify an external source of coherent radiation;

electron beam transport means for directing said electron beam from said first cavity means, through said wiggler means, to said second cavity means;

whereby placement of said first cavity means adjacent said second cavity means reduces rf coupling losses to further enhance efficiency of said electron beam laser system.

17. The system of claim 16 wherein said electron beam transport means comprises means for changing the direction of said electron beam by approximately 180°.

18. The system of claim 16 wherein said electron beam transport means comprises means for changing the direction of said electron beam by approximately 360°.

19. The laser amplifier system of claim 16 further comprising optical ring cavity means for enhancing intensity of an output laser beam produced by said electron beam laser amplifier system.

* * * * *